United States Patent
Xu et al.

(10) Patent No.: US 9,961,714 B2
(45) Date of Patent: May 1, 2018

(54) STATE SWITCHING METHOD AND DEVICE FOR SMALL CELL BASE STATION AND COMPUTER STORAGE MEDIUM

(71) Applicant: ZTE Corporation, Shenzhen, Guangdong (CN)

(72) Inventors: Hanqing Xu, Shenzhen (CN); Yajun Zhao, Shenzhen (CN); Linmei Mo, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days. days.

(21) Appl. No.: 15/113,574

(22) PCT Filed: Jun. 23, 2014

(86) PCT No.: PCT/CN2014/080551
§ 371 (c)(1),
(2) Date: Jul. 22, 2016

(87) PCT Pub. No.: WO2015/109747
PCT Pub. Date: Jul. 30, 2015

(65) Prior Publication Data
US 2017/0013671 A1    Jan. 12, 2017

(30) Foreign Application Priority Data
Jan. 24, 2014  (CN) .......................... 2014 1 0037008

(51) Int. Cl.
*H04W 40/00*    (2009.01)
*H04W 76/04*    (2009.01)
(Continued)

(52) U.S. Cl.
CPC ......... *H04W 76/046* (2013.01); *H04W 16/32* (2013.01); *H04W 24/02* (2013.01); *H04W 52/0206* (2013.01); *Y02B 60/50* (2013.01)

(58) Field of Classification Search
CPC . H04W 16/04; H04W 16/08; H04W 52/0206; H04W 52/0216; H04W 52/0251;
(Continued)

(56) References Cited

U.S. PATENT DOCUMENTS

| 8,515,410 B1 | 8/2013 | Bach |
| 2011/0085611 A1* | 4/2011 | Laroia .................. H04B 7/2678 375/260 |

(Continued)

FOREIGN PATENT DOCUMENTS

| CN | 101925154 A | 12/2010 |
| CN | 102421172 A | 4/2012 |

(Continued)

OTHER PUBLICATIONS

Supplementary European Search Report in European application No. 14879574.3, dated Dec. 23, 2016, 9 pgs.
(Continued)

*Primary Examiner* — Temica M Beamer
(74) *Attorney, Agent, or Firm* — Cooper Legal Group, LLC

(57) ABSTRACT

The present invention relates to the field of wireless communications. Disclosed are a state switching method and device for a small cell base station and a computer storage medium. The method comprises: acquiring state switching information comprising a state switching mode and performing state switching on the small cell base station according to the state switching information.

18 Claims, 2 Drawing Sheets

(51) Int. Cl.
*H04W 24/02* (2009.01)
*H04W 52/02* (2009.01)
*H04W 16/32* (2009.01)

(58) Field of Classification Search
CPC . H04W 52/0258; H04W 28/02; H04W 28/08; H04W 28/16; H04W 28/0231; H04W 28/0247; H04W 28/0289; H04W 48/12; H04W 48/16; H04W 48/18; H04W 48/20; H04W 88/06
USPC .......... 455/434, 453, 522, 449, 574
See application file for complete search history.

(56) References Cited

U.S. PATENT DOCUMENTS

| | | |
|---|---|---|
| 2012/0028632 A1 | 2/2012 | Maeder |
| 2012/0100881 A1* | 4/2012 | Son .................. H04W 52/0216 455/521 |
| 2013/0189932 A1 | 7/2013 | Shen |
| 2013/0244736 A1* | 9/2013 | Ho .................... H04W 52/0251 455/574 |
| 2013/0286848 A1 | 10/2013 | Xu et al. |
| 2013/0286912 A1 | 10/2013 | Xu et al. |
| 2013/0286928 A1 | 10/2013 | Xu et al. |
| 2014/0018092 A1 | 1/2014 | Maeder et al. |
| 2014/0073311 A1* | 3/2014 | Xu .................... H04W 52/0206 455/418 |
| 2015/0011226 A1* | 1/2015 | De Sousa ............ H04W 24/02 455/446 |
| 2015/0189532 A1* | 7/2015 | Dimou ................ H04W 28/021 455/418 |
| 2015/0245270 A1 | 8/2015 | Wu |

FOREIGN PATENT DOCUMENTS

| | | |
|---|---|---|
| CN | 103338503 A | 10/2013 |
| EP | 2355594 A1 | 8/2011 |
| WO | 2014070785 A1 | 5/2014 |

OTHER PUBLICATIONS

Louai Saker et al:"Minimizing Energy Consumption via Sleep Mode in Green Base Station", Apr. 2010, Wireless Communications and Networking Conference (WCNC),2010 IEEE, IEEE,Piscataway,NJ, USA, pp. 1-6.

International Search Report in international application No. PCT/CN2014/080551, dated Oct. 27, 2014, 5 pgs.

English Translation of the Written Opinion of the International Search Authority in international application No. PCT/CN2014/080551, dated Oct. 27, 2014, 12 pgs.

"Further Considerations on Enhanced Transition Procedures of Small Cell On/Off Scheme", Nov. 11, 2013, 3GPP TSG RAN WG1 Meeting #75, R1-135350, ZTE, 8 pgs.

"Small Cell On/Off Operational Modes", Nov. 11, 2013, 3GPP TSG RAN WG1 Meeting #75, R1-135658, Ericsson, 5 pgs.

* cited by examiner

STATE SWITCHING METHOD AND DEVICE FOR SMALL CELL BASE STATION AND COMPUTER STORAGE MEDIUM

TECHNICAL FIELD

The disclosure relates to a state switching technology for a small cell Evolved Node B (eNodeB) in the field of wireless communication, and in particular to a state switching method and device for a small cell eNodeB and a computer storage medium.

BACKGROUND

With the rapid development of mobile Internet and increasing popularization of intelligent terminals, users have higher and higher requirements on data transmission rate and user experience. For improving user perception and system throughput, especially the throughput of hot spots, the networking architecture of a heterogeneous network can be adopted, that is, a large number of small cells are deployed in a coverage area of macro cells.

The dense deployment of small cells is an effective mechanism for improving network capacity and reducing coverage hole, but it causes serious interference between the small cells and increases energy consumption of the small cell. So in order to reduce the mutual interference between the small cells and the energy consumption of a small cell eNodeB, it is necessary to make the small cell eNodeB enter a sleep state with low energy consumption at an appropriate time. Aiming at making the small cell eNodeB enter the sleep state and how to activate the small cell in the sleep state, several modes are presented in the related art; but each mode has its advantages and disadvantages.

How to implement compatibility with or select from multiple sleep modes or activating modes at a same small cell eNodeB is a problem to be solved in the related art.

SUMMARY

For solving the existing technical problem, embodiments of the disclosure provide a state switching method and device for a small cell eNodeB and a computer storage medium.

The technical solutions of the embodiments of the disclosure are implemented as follows.

An embodiment of the disclosure provides a state switching method for a small cell eNodeB, which includes:

state switching information including a state switching mode is acquired; and state switching of the small cell eNodeB is performed according to the state switching information.

An embodiment of the disclosure further provides a state switching device for a small cell eNodeB, which includes:

an acquiring unit configured to acquire state switching information including a state switching mode; and a switching unit configured to perform the state switching of the small cell eNodeB according to the state switching information.

An embodiment of the disclosure further provides a computer storage medium having stored therein computer programs configured to perform the state switching method for a small cell eNodeB.

The state switching method and device for a small cell eNodeB and the computer storage medium provided by the embodiments of the disclosure perform state switching according to the acquired state switching information; compared with the existing method of performing state switching for the small cell eNodeB according to a preset switching mode, the disclosure can flexibly select the state switching mode based on an indication of the state information and ensure normal access or quit of various UEs while reducing the power of the small cell eNodeB as much as possible, so that the users' satisfaction is improved.

DETAILED DESCRIPTION

The technical solutions of the disclosure are elaborated below in combination with the accompanying drawings and specific embodiments.

Embodiment 1

Figure 1:
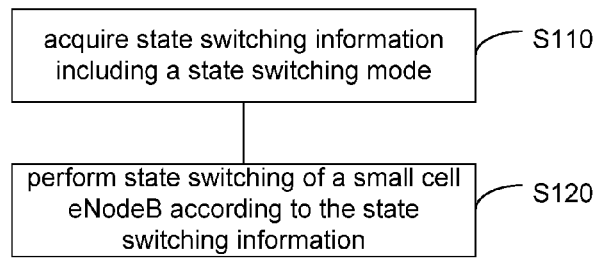
FIG. 1 is a flowchart of a state switching method for a small cell eNodeB according to an embodiment 1 of the disclosure.

As shown in FIG. 1, the present embodiment provides a state switching method for a small cell eNodeB, which includes the following steps:

Step S110: state switching information including a state switching mode is acquired; and Step S120: the state switching of a small cell eNodeB is performed according to the state switching information.

In the present embodiment, the state switching of the small cell eNodeB includes that the small cell eNodeB enters a sleep state from an activated state and enters the activated state from the sleep state.

In a wireless network, usually the coverage of a micro eNodeB or a small eNodeB or a home eNodeB forms the small cell; in a physical area where the small cell is located, there may also be the coverage of a macro eNodeB and other micro eNodeBs or small eNodeBs or home eNodeBs. Usually, some small cell eNodeBs aggregate to form a cluster. A management network element of the cluster is generally called a cluster head. The cluster head can be either a separate physical network element or a logical network element divided from the existing network management device.

In Step S110, there are at least three methods for acquiring a sleep mode or sleep configuration.

The first method is that the small cell eNodeB required to enter the sleep state selects the state switching mode to generate the state switching information based on an access status of its current UEs, UE type, the performance and compatibility of the small cell eNodeB, and a status about interference coverage of the small cell's neighbouring cell. Particularly, the access status such as the current number of accessing UEs, the data traffic, and the UE type in the small cell can be determined according to a random access signal of the UE or a feedback to a first signal. Parameters, such as the performance and compatibility, of the small cell eNodeB can be extracted by the small cell eNodeB freely or preset by administrators. The status about interference coverage of the neighbouring cell of the small cell can be acquired by receiving information sent by a management device or an eNodeB of a neighbouring cell of the small cell, which can be implemented by several methods; these methods will not be introduced here.

The second method is that: the small cell eNodeB receives or sends the state switching information from the eNodeB of the neighbouring cell of the small cell, the macro eNodeB covering the macro cell of the small cell or the cluster head of the small cell eNodeB. Generally, the macro eNodeB or the cluster head is the upper-level network element of the small cell eNodeB according to device performance and logical division. The macro eNodeB or the cluster head can assign and schedule the small cell eNodeB uniformly, so as to reduce the coverage and transmission power in a joint coverage area of the wireless networks and flexibly use various sleep modes, and can ensure timely access or quit of the UEs, so as to improve users' satisfaction.

The third method is that: when the small cell eNodeB is a Secondary eNodeB (SeNB) for assisting other eNodeBs, the state switching information can also be received from a Master eNodeB (MeNB) of the small cell eNodeB. A method for the MeNB of the small cell eNodeB to form the state switching information can refer to the method for the small cell eNodeB and/or the macro eNodeB to form the state switching information.

Three state switching modes are provided below.

The first dynamic switching mode: the magnitude of a switching time taken for a small cell eNodeB to switch between the sleep state and the activated state is counted on a frame basis, and the switching time is short. Because the switching time is short, the small cell eNodeB can switch from the sleep state to the activated state quickly, so as to ensure the UE to access the small cell in the sleep state timely in the dense network, which is beneficial for improving the throughput for the entire network. However, when the small cell eNodeB enters the sleep state from the activated state, a traditional UE (which can be regarded as the UE corresponding to a communication protocol before the 3GPP Release-12 communication protocol) usually cannot access the target eNodeB in such a short time period, so the communication interruption of the traditional UE may happen.

The second one is a static switching mode, which can also be called a slow switching mode; usually the magnitude of switching time of this mode is from several hundred milliseconds to several seconds, and this mode can be compatible with quit of an R11 UE (which corresponds to the 3GP Release 11 communication protocol) and an older version of traditional UE. Particularly, the traditional UE can switch from the small cell to the target cell by means of a secondary cell deactivation method. But the static switching mode cannot enable the UE required to enter a sleep cell to timely access the small cell which is in the sleep state, so a negative impact may be caused on the overall throughput of networks.

The third one is a semi-static switching mode, which is a mode between the dynamic switching mode and the static switching mode; usually the magnitude of switching time of this mode is from ten milliseconds to several hundred milliseconds. The semi-static switching mode has a good performance on improving the network compared with the static switching mode but has a poor performance on improving the throughput compared with the dynamic switching mode; however, the semi-static switching mode can support, to a certain extent, the traditional UE to quit from the small cell during state switching compared with the dynamic switching mode.

When the small cell enters the sleep state from the activated state, the state switching information includes an indication of a sleep mode; the state switching information also includes the sleep configuration corresponding to the sleep mode. A method for a small cell eNodeB to sleep is provided based on Step S110 and Step S120.

Figure 2:
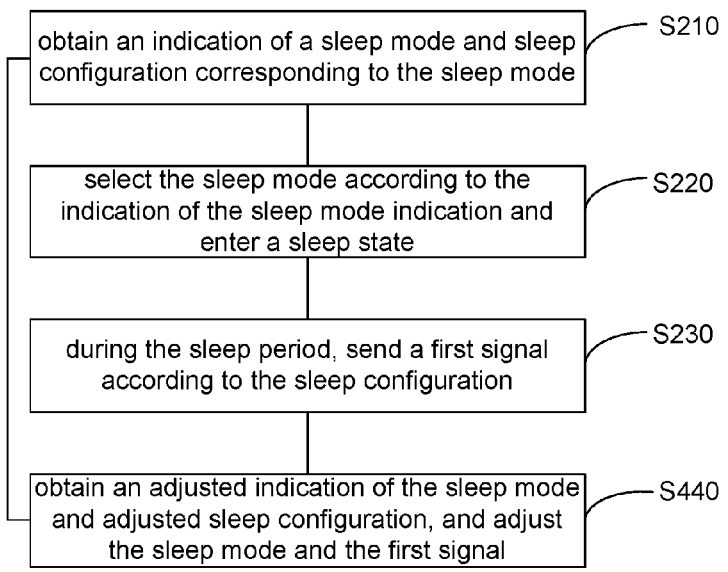
FIG. 2 is a flowchart of a method for a small cell eNodeB to sleep according to the embodiment 1 of the disclosure.

As shown in FIG. 2, the method for a small cell eNodeB to sleep includes the following steps:

Step S210: an indication of a sleep mode and the sleep configuration corresponding to the sleep mode are obtained;

Step S220: a sleep mode is selected according to the indication of the sleep mode; the small cell enters the sleep state; and Step S230: during the sleep period, a first signal is sent according to the sleep configuration, Herein the first signal includes at least one of a discovery signal, a synchronization signal, a Channel State Information-Reference Signal (CSI-RS), and a small cell specific reference signal. The small cell specific reference signal is a combination of one or more reference signals which is set according to the type of small cell and special requirements.

Herein, the sleep configuration includes a signal pattern and/or power of the first signal. The signal pattern can include a period and offset of the first signal. In addition, the configuration information can also include a sending frequency, power and radiation angle of each first signal. When the power is zero, the small cell eNodeB is in the sleep period, any signal will not be sent. Such a situation is suitable for the time when the network traffic is almost zero, for example, at night.

The sleep mode is a dynamic sleep mode, a semi-static sleep mode or a static sleep mode. The dynamic sleep mode is the dynamic switching mode which makes the small cell eNodeB enter the sleep state from the activated state; the static sleep mode is the static switching mode which makes the small cell eNodeB enter the sleep state from the activated state; the semi-static sleep mode is the semi-static switching mode which makes the small cell eNodeB enter the sleep state from the activated state.

In addition, the method for a small cell eNodeB to sleep may also include Step S240.

Step S240: an adjusted indication of the sleep mode and adjusted sleep configuration are obtained, and the sleep mode and the first signal are adjusted; Herein, the adjusted indication of the sleep mode and adjusted sleep configuration can be determined based on a result of measurement of the first signal fed back by the UE and/or a preset adjusting policy. In Step S240, after the sleep mode and sleep configuration of the small cell eNodeB are adjusted, return to Step S210 and perform Step S210 to Step S240 again.

The preset adjusting policy is a sleep negotiation policy of multiple small cell eNodeBs in the heterogeneous network. The sleep negotiation policy can enable the small cell eNodeB where fewer UEs are resident to enter the sleep state. Adjusting the first signal includes adjusting at least one of the type, signal pattern and power of the first signal.

Preferably, the method for a small cell eNodeB to sleep also includes that:

during the sleep period, the small cell eNodeB sends a scheduling instruction to the UE; and the result of measurement of the first signal made by the UE is received according to the scheduling instruction.

After the small cell eNodeB sleeps, because the result of measurement of the first signal made by the UE cannot directly transmitted to the small cell eNodeB, for receiving the result of measurement made by the UE to facilitate adjusting the sleep mode and the sleep configuration, the small cell eNodeB sends the scheduling instruction to the UE, and then the UE reports the result of measurement to the small cell eNodeB according to the scheduling instruction.

To sum up, compared with the existing method for a small cell to sleep, the method for a small cell eNodeB to sleep provided by the present embodiment is compatible with various sleep modes and can timely adjust the sleep modes according to reference factors for decision, such as the result of measurement reported by the UE and/or network requirements; in this way, the method ensures enough throughput in the network while reducing the power consumption by means of sleep, so that the users' satisfaction is improved.

When the small cell enters the activated state from the sleep state, the state switching information includes an indication of an activating mode. A method for activating a small cell eNodeB is provided based on Step S110 and Step S120.

Figure 3:
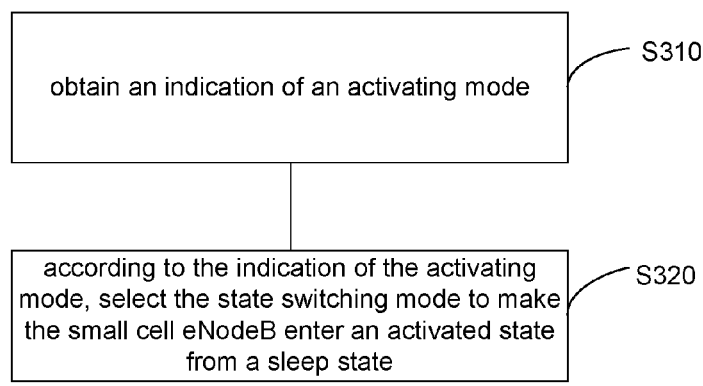
FIG. 3 is a flowchart of a method for activating a small cell eNodeB according to the embodiment 1 of the disclosure.

As shown in FIG. 3, the method for activating a small cell eNodeB includes the following steps:

Step S310: an indication of a activating mode is obtained;

Step S320: according to the indication of the activating mode, the state switching mode is selected to make the small cell eNodeB enter the activated state from the sleep state.

The activating mode is the state switching mode which makes the small cell eNodeB enter the activated state from the sleep sate, including a dynamic activating mode (also called a dynamic on/off mode) corresponding to the dynamic switching mode, a semi-static activating mode (also called a semi-static on/off mode) corresponding to the semi-static switching mode, and a static activating mode (also called a static on/off mode) corresponding to the static switching mode.

Compared with the existing fixed activating method, the method for activating a small cell eNodeB provided by the present embodiment can be compatible with and flexibly select multiple activating modes, and can improve the throughput effectively.

Preferably, the state switching information is also sent to the eNodeB of the neighbouring cell of the small cell and UE for selection coordination and interference coordination of the sleep mode between the small cell and its neighbouring cell.

Particularly, the indication of the activating mode or activating time in the state switching information will also be sent to the UE to inform the UE that the small cell eNodeB will be or has been activated. In this way, the UE can learn the time when the small cell eNodeB enters the activated state from the sleep state, which avoids the signal sent by the activated small cell eNodeB from being regarded as noise by the UE, and improves the actual throughput of a system.

The method for activating a small cell eNodeB provided by the present embodiment can flexibly select the activating mode based on requirements, minimize the power, and improve communication performances, such as the throughput of each cell and interference coordination.

The state switching information also includes time information about the state switching of the small cell eNodeB, so that the UE sends information to the small cell eNodeB according to the time information.

The method also includes that:

a measurement set reported by the UE is received; the measurement set includes at least one small cell eNodeB that the UE selects from the found small cell eNodeBs according to a measurement reporting policy and reports;

the small cell eNodeB which can perform state switching is selected from the measurement set according to a selecting policy; the selecting policy can be selecting, according to the results of measurement, small cell eNodeBs corresponding to N results of measurement of the discover signals with the highest quality, Herein N is a positive integer and less than or equal to the number of the small cell eNodeBs in the network.

Herein, a switching set may include a first switching set and a second switching set; the first switching set includes a number of small cell eNodeBs which can enter the sleep state from the activated state; the second switching set includes a number of small cell eNodeBs which can enter the activated state from the sleep state. When the state of the small cell eNodeB is switched, the small cell eNodeB is selected from the switching set, and the state switching information is sent.

In the present embodiment, the set can record the small cell eNodeBs in a table.

The eNodeB sends the discovery signal in both the activated state and the sleep state. In the activated state, the frequency of sending the discovery signal is higher than that in the sleep state. In a special sleep state, the eNodeB may not send the discovery signal. The UE will receive the signal sent by the eNodeB in the network; if the UE receives the discovery signal of a certain eNodeB, namely discovers the eNodeB, an eNodeB set including eNodeBs discovered by the UE will be formed, which is called a discover set.

According to the measurement reporting policy, the UE selectively measures the discovery signal from the discover set and reports it to the eNodeB (which is the small cell eNodeB, the cluster head, the macro eNodeB, the eNodeB of the neighbouring cell of the small cell and/or the MeNB of the small cell eNodeB in the present embodiment) to form the measurement set. The specific measurement mode can be: performing Reference Signal Received Power/Reference Signal Received Quality (RSRP/RSRQ) measurement according to the discovery signal.

The measuring and reporting policy can be that the UE measures and reports some discovery signals in the discover set according to an indication of a network side, or measures all discovery signals in the discover set and reports all of them to the eNodeB or a network element entity at the network side for a device at the network side to select freely. There are many measuring and reporting policies, but they will not be repeated here.

Preferably, after forming the switching set, the switching set is sent to the UE. The switching set is sent to the UE, so that the UE learns in advance which small cell eNodeBs in the network will perform state switching, and prepares for switching correspondingly.

Preferably, the switching information also includes operation indication information. The operation indication information is used for indicating the small cell eNodeB to perform state switching independently or perform state switching synergistically with the help of the macro eNodeB, the cluster head, the eNodeB of the neighbouring cell of the small cell and/or the MeNB of the small cell eNodeB. Particularly, the macro eNodeB, the cluster head, the eNodeB of the neighbouring cell of the small cell and/or the MeNB of the small cell eNodeB coordinate the state switching of each eNodeB in the network by sending state switching parameters or instructions to the small cell eNodeB.

Particularly, when the small cell eNodeB is the SeNB, it will perform state switching according to a decision of the MeNB.

To sum up, the state switching method for a small cell eNodeB provided by the present embodiment can flexibly configure the state and state switching mode of each small cell in the network according to the current wireless network situation and service requirements, so as to provide a good communication environment while reducing the energy consumption of the device at the network side.

Embodiment 2

Figure 4:
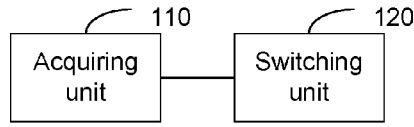
FIG. 4 is a structure diagram of a state switching device for a small cell eNodeB according to an embodiment 2 of the disclosure.
Figure 5:
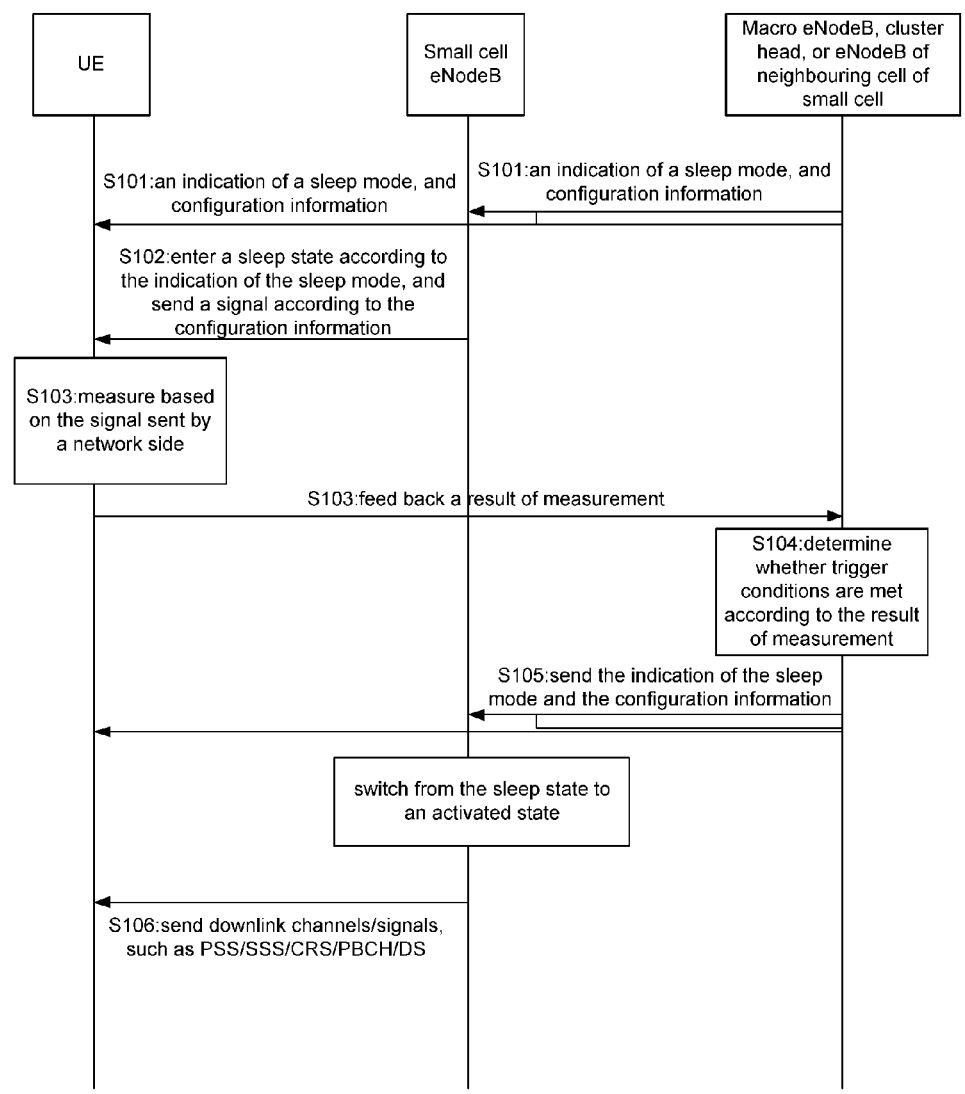
FIG. 5 is a flowchart of an application example based on the state switching method for a small cell eNodeB of the disclosure.

As shown in FIG. 4, the present embodiment provides a state switching device for a small cell eNodeB, which includes:

an acquiring unit 110, which is configured to acquire the state switching information including the state switching mode; and a switching unit 120, which is configured to perform the state switching of the small cell eNodeB according to the state switching information.

The specific structure of the acquiring unit 110 may include a communication interface, for example, a receiving antenna which is used for receiving the state switching information from the macro eNodeB, the cluster head, the eNodeB of the neighbouring cell of the small cell or the MeNB of the small cell eNodeB. The acquiring unit 110 may also be a processor which processes data by executing a program or software in the storage medium to form the state switching information. The structure of the acquiring unit 110 is different depending on different methods for acquiring state switching information.

The specific structure of the switching unit 120 may be a processor which is configured to execute the program or software stored in advance to complete the state switching of the small cell eNodeB.

The processor may be electronic devices with processing functions, such as a central processing unit, a single chip microcomputer, a digital signal processor, or a field programmable gate array. The program or software is stored in the storage medium. The storage medium is a non-instantaneous storage medium preferably. Data interaction between the storage medium and the processor can be performed through a bus or a data interface.

The device can be set separately or a functional unit integrated on the small cell eNodeB or the small cell eNodeB.

Preferably, the state switching information includes an indication of a sleep mode. The state switching information also includes the sleep configuration corresponding to the sleep mode.

The switching unit 120 is configured to select, according to the indication of activating mode, the state switching mode to make the small cell eNodeB enter the sleep state from the activated state. The device also includes a sending unit. The sending unit is configured for the small cell eNodeB to send the first signal according to the sleep configuration during the sleep period, Herein the first signal includes at least one of the discovery signal, the synchronization signal, the CSI-RS, and the small cell specific reference signal; the sleep mode is the dynamic sleep mode, the semi-static sleep mode or the static sleep mode. The specific structure of the sending unit can be a sending antenna.

The device also includes an adjusting unit which is configured to obtain an adjusted indication of the sleep mode and adjusted sleep configuration and adjust the sleep mode and the first signal; Herein, the adjusted indication of the sleep mode and adjusted sleep configuration are determined based on the result of measurement of the first signal fed back by the UE and/or the preset adjusting policy. Herein, the sleep configuration includes the signal pattern and/or power of the first signal.

The sending unit is further configured to send the scheduling instruction to the UE during the sleep period.

The device also includes a receiving unit, which is configured to receive the result of measurement of the first signal made by the UE according to the scheduling instruction. The specific structure of the receiving unit may include the communication interface, for example, the sending antenna.

The state switching information includes an indication of an activating mode.

The switching unit 120 is further configured to select, according to the indication of the activating mode, the state switching mode to make the small cell eNodeB enter the activated state from the sleep state. The activating modes include the dynamic activating mode, the semi-static activating mode, and the static activating mode.

The acquiring unit 110 is configured to receive the state switching information sent by the macro eNodeB, the cluster head and/or the eNodeB of the neighbouring cell of the small cell, or generate the state switching information.

The device is further configured to send the state switching information to the eNodeB of the neighbouring cell of the small cell and the UE for selection coordination and interference coordination of the sleep mode between the small cell and its neighbouring cell. The device sends, through the sending unit, the state switching information to the eNodeB of the neighbouring cell of the small cell and the UE.

In addition, the state switching information also includes the time information about the state switching of the small cell eNodeB, so that the UE sends information to the small cell eNodeB according to the time information.

The device is further configured to receive, through the receiving antenna, the measurement set reported by the UE and use the processor to select from the measurement set the small cell eNodeB which can perform state switching according to the selecting policy to form the switching set, Herein the measurement set includes at least one small cell eNodeB that the UE selects from the found small cell eNodeBs according to the measuring and reporting policy and reports.

Herein, the switching set may include the first switching set and the second switching set; the first switching set includes a number of small cell eNodeBs which can enter the sleep state from the activated state; the second switching set includes a number of small cell eNodeBs which can enter the activated state from the sleep state.

The device also sends, through the receiving antenna and other communication interfaces, the switching set to the UE after forming the switching set.

In addition, the switching information also includes the operation indication information for indicating the small cell eNodeB to perform state switching independently or synergistically. The switching unit 120 is configured to make the cell eNodeB to perform state switching independently or synergistically according to the operation indication information.

The switching unit 120 is configured to, when the operation indication information indicates the small cell eNodeB to perform state switching independently, make the cell eNodeB to perform state switching independently, and when operation indication information indicates the small cell eNodeB to perform state switching synergistically, make the cell eNodeB to perform state switching synergistically according to the decision of the MeNB.

The device of the present embodiment provides a specific hardware structure for the state switching method for a small cell eNodeB in the embodiment 1. The device can be used for implementing any technical solution of the state switching method for a small cell eNodeB, and can flexibly select the switching mode to implement the switching of the small cell eNodeB in the network.

Several application examples are provided below in combination with the embodiment 1 and embodiment 2.

EXAMPLE 1

A state switching method for a small cell includes the following steps.

Step S101: when a small cell eNodeB needs to sleep, the macro eNodeB or the cluster head or the eNodeB of the neighbouring cell of the small cell that is about to sleep sends the indication of the sleep mode and configuration information about the signal sent by the small cell eNodeB during the sleep period to the small cell eNodeB that is about to sleep, and/or its neighbouring cell, and/or the UE. In the specific implementation, the indication of the sleep mode and the configuration information can also be generated by the small cell eNodeB. The configuration information may include the signal pattern of the signal sent by the small cell eNodeB during the sleep period. Usually the signal pattern corresponds to the period, offset, radiation angle and radiation scope of the signal sent by the small cell eNodeB during the sleep period. The configuration information may also include a relative value or an absolute value of the power of the sent signal.

Step S102: the small cell eNodeB that is about to sleep sleeps according to the sleep mode indicated or determined in the indication of the sleep mode, and sends signals according to the configuration information during the sleep period. The signals include the discovery signal, the CSI-RS, and/or other signals for measurement and synchronization.

Step S103: the UE receives the indication of the sleep mode and the configuration information sent by the network side and the signal sent in Step S102, measures according to the received signal, and reports the result of measurement to the cell eNodeB serving the UE. The cell eNodeB serving the UE may be the macro eNodeB, the neighbouring cell of the small cell in the sleep state, or the small cell eNodeB in the sleep state. If the macro eNodeB or the cluster head or the small cell eNodeB in the sleep state receives the result of measurement of the UE and determines, based on the result of measurement and the type of UE, that it is needed to update the sleep mode of the small cell eNodeB in the sleep state, it is needed to perform the operation from Step S101 to this step again.

Step S104: if trigger conditions (which can be that: a service situation changes, the UE is associated with the small cell, or a data packet reaches the small cell eNodeB), the macro eNodeB or the cluster head or the small cell eNodeB in the sleep state updates parameter configuration and selects the corresponding activating mode to activate the small cell eNodeB in the sleep state; the activating modes may include the dynamic on/off mode, the semi-static on/off mode, and/or other modes (e.g. the static on/off mode). The sleep modes, and the performance and compatibility of the small cell eNodeB corresponding to each sleep mode can be taken into a comprehensive consideration during selecting.

Step S105: the macro eNodeB sends an activating command and/or indication of an activating mode to the small cell eNodeB in the sleep state, the eNodeB of the neighbouring cell of the small cell in the sleep state, and/or the UE. The cluster head or the small cell eNodeB or the eNodeB of the neighbouring cell of the small cell can also send the activating command and/or the indication of the activating mode.

Step S106: the small cell eNodeB enters the activated state from the sleep state, and starts sending the reference signal and public channel, and sends the data packet to the UE. For the dynamic on/off mode, the activated small cell eNodeB in the sleep state can send the reference signal, downlink channel and data before sending the first data to the UE. For the semi-static on/off mode or the static on/off mode, before sending the first data to the UE, the activated small cell eNodeB in the sleep state may start sending a first data packet after a handover operation or secondary serving cell (SCell) activation/deactivation operation. The on/off mode is the switching mode of the small cell eNodeB from sleep to activation. In the specific implementation process, before the activated small cell eNodeB sends the first data packet to the UE, the sent signals can be a Primary Synchronization Signal (PSS), a Secondary Synchronization Signal (SSS), a Cell-specific Reference Signal (CRS), the CSI-RS, a Physical Broadcast Channel (PBCH), and/or the discovery signal.

EXAMPLE 2

Aiming at an application scenario of Carrier Aggregation (CA), the state switching method for a small cell eNodeB includes the following steps.

a. a UE 1 receives downlink discovery signals sent by the small cell eNodeBs nearby; all these small cell eNodeBs form the discover set of the UE 1. For example, the discover set of the UE 1 is A1 this time; some small cell eNodeBs in the A1 may be limited to the UE 1, that is, they cannot serve the UE 1.

b. the UE 1 can perform discover detection and RSRP/RSRQ measurement on the discovery signal based on the received discovery signal sent by each small cell eNodeB.

c. the UE 1 reports the results of measurement and discovered conditions to a primary serving cell (PCell); these measured and reported small cell eNodeBs form the measurement set. For example, there are measurements of the discovery signals sent by eight small cell eNodeBs to be reported, and the eight small cell eNodeBs can compose the measurement set B1, then the UE 1 reports the results of measurement and discovered conditions in the measurement set B1 to the PCell.

d. after receiving the measurement set, the PCell can determine the switching set aiming at the UE 1, for example, an ON/OFF candidate set, can configure or add the small cell eNodeB in the ON/OFF candidate set as the SCell of the UE, and inform the UE 1 of the ON/OFF candidate set of the UE and an SCell adding or deleting situation. For example, three small cells, whose qualities of discovery signals are in the top three places, of the eight small cells in the above measurement set can compose the ON/OFF candidate set C1.

e. when there is an uplink trigger requirement, a downlink trigger requirement, or both an uplink trigger requirement and a downlink trigger requirement (e.g. the service situation changes, or the UE is associated with the small cell, or the data packet arrives), a normal ON/OFF flow is performed.

EXAMPLE 3

Aiming at an application scenario of Coordinated Multi-Point (CoMP), the state switching method for a small cell eNodeB includes the following steps.

a. a UE 2 receives the downlink discovery signals sent by the small cell eNodeBs nearby; all these small cell eNodeBs can be defined as the discover set of the UE 2. For example, the discover set of the UE 2 is A2 this time; some small cell eNodeBs in the A2 may be limited to the UE 2, that is, they cannot serve the UE 2.

b. the UE 2 can perform the discover detection and RSRP/RSRQ measurement based on the received discovery signal sent by each small cell eNodeB.

c. the UE 2 reports the results of measurement and discovered conditions to the PCell; these measured and reported small cell eNodeBs form the measurement set. For example, there are measurements of the discovery signals sent by eight small cell eNodeBs to be reported, and the eight small cell eNodeBs can compose the measurement set B2, then the UE 2 reports the results of measurement and discovered conditions based on the discovery signals of the small cell eNodeBs in the measurement set B2 to the PCell.

d. after receiving the results of measurement of the measurement set, the PCell can determine the ON/OFF candidate set aiming at the UE, can configure or add the small cell eNodeB in the ON/OFF candidate set as the CoMP set of the UE, and inform the UE 2 of the ON/OFF candidate set of the UE and a CoMP set situation. For example, three small cells, whose qualities of discovery signals are in the top three places, of the eight small cells in the above measurement set can compose the ON/OFF candidate set C2; the ON/OFF candidate set corresponds to the switching set in the embodiment 1 and embodiment 2.

e. when there is the uplink trigger requirement, the downlink trigger requirement, or both the uplink trigger requirement and downlink trigger requirement (e.g. the service situation changes, or the UE is associated with the small cell, or the data packet arrives), the normal ON/OFF flow is performed.

EXAMPLE 4

Aiming at an application scenario of dual connectivity, the state switching method for a small cell eNodeB includes the following steps.

a. the UE 3 receives the downlink discovery signals sent by the small cell eNodeBs nearby; all these small cell eNodeBs form the discover set of the UE 3. For example, the discover set of the UE 3 is A3 this time; some small cell eNodeBs in the A3 may be limited to the UE 3, that is, they cannot serve the UE 3.

b. the UE 3 can perform the discover detection and RSRP/RSRQ measurement based on the received discovery signal sent by each small cell eNodeB.

c. the UE 3 reports the results of measurement and discovered conditions to the MeNB; these measured and reported small cell eNodeBs form the measurement set of the UE 3. For example, there are measurements of the discovery signals sent by eight small cell eNodeBs to be reported, and the eight small cell eNodeBs can compose the measurement set B3, then the UE 3 reports the results of measurement and discovered conditions based on the discovery signals of the small cell eNodeBs in the measurement set B3 to the MeNB.

d. after receiving the results of measurement of the measurement set, the MeNB can determine the ON/OFF candidate set aiming at the UE, can configure or add the small cell eNodeB in the ON/OFF candidate set as the SeNB of the UE, and inform the UE 3 of the ON/OFF candidate set of the UE and an SeNB adding or deleting situation. For example, three small cells, whose qualities of discovery signals are in the top three places, of the eight small cells in the above measurement set can compose the ON/OFF candidate set C3.

e. when there is the uplink trigger requirement, the downlink trigger requirement, or both the uplink trigger requirement and downlink trigger requirement (e.g. the service situation changes, or the UE is associated with the small cell, or the data packet arrives), the normal ON/OFF flow is performed.

EXAMPLE 5

Aiming at an application scenario of dual connectivity, because of a non-ideal backhaul factor, a transmission delay between communication nodes (between the small cell eNodeB and the UE or eNodeB) is more than or equal to 20 ms, which lengthens the switching time, and a relative delay of an Xn interface, an X2 interface and an idle interface will also cause interference and cause the UE to misjudge a switching time point. So a new method for activating the small cell eNodeB in the sleep state can be selected. The specific implementation of the method is as follows.

a. first of all, when a small cell is off, the macro eNodeB (or the cluster head, or the small cell, or the neighbouring cell of the small cell) sends the sleep configurations, such as the indication of the sleep mode and the signal pattern of the first signal, to the small cell eNodeB that is about to sleep, the eNodeB of the neighbouring cell of the small cell that is about to sleep, and/or the UE;

for reducing interference and power consumption, the macro eNodeB (or the cluster head, or the small cell, or the neighbouring cell of the small cell) can only send the corresponding configuration of the discovery signal to the small cell in the sleep state, and/or the neighbouring cell of the small cell, and/or the UE, that is, a fixed sleep mode is adopted.

b. the small cell eNodeB that is about to sleep sends the signal correspondingly according to the indicated or determined sleep mode or sleep configuration (which can be only the corresponding configuration of the discovery signal).

c. the UE receives the indication of the sleep mode and sleep configuration (which can be only the corresponding configuration of the discovery signal) sent by the network side, receives and measures the discovery signal, and reports the result of measurement to the network side.

d. the network side can perform, according to the result of measurement reported by the UE, a dual-connectivity addition and deletion operation to the measured small cell eNodeB (including the small cell in the sleep state) reported by the UE. For example, the network can configure the small cell eNodeB that is about to sleep as the SeNB.

e. the MeNB can send the sleep mode, the activating mode, and the operation indication information to the small cell eNodeB. The operation indication information is used for indicating the small cell eNodeB to complete the state switching independently or synergistically; when the operation indication information indicates the small cell eNodeB to complete the state switching synergistically, the small cell eNodeB also needs to receive the decision of the MeNB when performing the state switching, and then performs the state switching according to the state switching information and decision.

f. the small cell eNodeB receives the state switching information sent by the MeNB and performs the state switching according to the sleep mode, the activating mode, and the operation indication information and decision.

g. the MeNB can consider changing a sending situation of the SeNB in the sleep state according to the current service requirement or interference, so as to activate the SeNB faster. For example, the current MeNB has borne too many services, or bears a lot of services sometimes but bears a few services sometimes, that is, it presents a discontinuously serving state, so there is a requirement for activating the SeNB anytime. Then, the MeNB sends the signal pattern and sending configuration in a Discontinuous Transmission ON (DTX_ON) state to the SeNB and UE.

The DTX_ON state is a sub-state of the sleep state. In the DTX_ON state, a sleep cell will switch on its transmitter periodically to send the discovery signal and other necessary downlink signals. When the small cell eNodeB is in a DTX_OFF state, it does not send any signal. The signal pattern in the DTX-ON state includes a signal period and duration.

In the DTX_ON state, the small cell eNodeB may send: (1) the signal which is used for being found by the UE; (2) the PSS/SSS and/or the CRS which are/is used for synchronization between the UE and the small cell eNodeB. The sending periods of these signals may be different. When the small cell is in the DTX_ON state, one or several signals may be sent. The sending configuration is the type of signals sent by the SeNB during the period of DTX_ON and sending parameters.

h. after receiving the signal pattern and sending configuration in the DTX_ON state which are sent by the MeNB, the SeNB in the sleep state sends the corresponding signal during the period of DTX_ON according to the signal pattern and sending configuration in the DTX_ON state. The UE receives these signals in a Discontinuous Receive ON (DRX_ON) state, measures these signals and feeds back the results of measurement to the SeNB.

i. when the trigger conditions are met (the uplink UE triggers through a Random Access Channel (RACH) or a Scheduling Request (SR) or by sending a Physical Downlink Control Channel (PDCCH) command), for example, the data packet arrives, the SeNB changes the DTX state, enters the ON state, and sends the downlink data to the UE.

In the embodiments provided in the application, it should be understood that the disclosed device and method can be realized in other ways. The embodiment of the device described above is only schematic; the division of the units is only a division of logical functions, and there can be other dividing modes during the actual implementation, for example, multiple units or components can be combined or integrated to another system, or some features can be ignored or are not executed. In addition, coupling, direct coupling, or communication connection among the shown or discussed components can be implemented through indirect coupling or communication connection of some interfaces, devices, or units, and can be in an electrical form, a mechanical form or other forms.

The above units described as separate parts may be or may not be separated; the parts shown as the units may be or may not be the physical units, and can be either located in a place or distributed on multiple network units; a part or all of the units can be selected, according to actual needs, to achieve the purpose of the solution of the embodiment.

In addition, all the functional units in the embodiments of the disclosure can be integrated on a processing module; or each of the functional units serves as a unit separately; or two or more than two units are integrated in a unit. The integrated unit can be realized in a form of hardware or in a form of hardware and software functional unit.

Those skilled in the art can understand that: all or part of the steps for implementing the embodiment of the method can be completed by means of hardware related to a program instruction. The program can be stored in a computer readable storage medium; when the program is executed, the steps of the method are performed. The storage medium can be various medium which can store program codes, such as a mobile storage device, a Read-Only Memory (ROM), a magnetic disk, or a compact disk.

Correspondingly, the embodiment of the disclosure also provides a computer storage medium having stored therein computer programs configured to perform the state switching method for the small cell eNodeB provided by the embodiment of the disclosure.

The above is only the specific implementation mode of the disclosure and not intended to limit the scope of protection of the disclosure; any change or replacement that those skilled in the art can think of easily in the scope of technologies disclosed by the disclosure shall fall within the scope of protection of the disclosure. So, the scope of protection of the disclosure is subject to the scope of protection of the claims.

The invention claimed is:

1. A state switching method for a small cell Evolved Node B (eNodeB), comprising:
    acquiring state switching information comprising a state switching mode, the state switching information comprising an indication of a sleep mode or an indication of an activating mode, the sleep mode being a state switching mode which makes the small cell eNodeB enter a sleep state from an activated state and comprising a dynamic sleep mode, a semi-static sleep mode or a static sleep mode, and the activating mode being a state switching mode which makes the small cell eNodeB enter the activated state from the sleep state and comprising a dynamic activating mode, a semi-static activating mode or a static activating mode; and
    performing state switching of the small cell eNodeB according to the state switching information,
    wherein acquiring the state switching information comprising the state switching mode comprises:
        receiving the state switching information sent by a macro eNodeB, a cluster head and/or an eNodeB of a neighbouring cell of a small cell; or
        generating, by the small cell eNodeB per se, the state switching information; or
        when the small cell eNodeB is a Secondary eNodeB (SeNB), receiving the state switching information from a Master eNodeB (MeNB) of the small cell eNodeB, and
    wherein when the state switching information comprises the indication of the sleep mode, the state switching information further comprises sleep configuration corresponding to the sleep mode,
        performing the state switching of the small cell eNodeB according to the state switching information comprises:

according to the indication of the sleep mode, selecting the state switching mode to make the small cell eNodeB enter the sleep state from the activated state, and the method further comprises:
during a sleep period, sending, by the small cell eNodeB, a first signal according to the sleep configuration, wherein the first signal comprises at least one of a discovery signal, a synchronization signal, a Channel State Information-Reference Signal (CSI-RS), or a small cell specific reference signal.

2. The method according to claim 1, further comprising:
obtaining an adjusted indication of the sleep mode and adjusted sleep configuration, and adjusting the sleep mode and the first signal.

3. The method according to claim 1, wherein the sleep configuration comprises a signal pattern and/or power of the first signal.

4. The method according to claim 1, further comprising:
sending, during the sleep period, a scheduling instruction to User Equipment (UE); and
receiving a result of measurement of the first signal made by the UE according to the scheduling instruction.

5. The method according to claim 1, wherein when the state switching information comprises the indication of the activating mode,
performing the state switching of the small cell eNodeB according to the state switching information comprises:
according to the indication of the activating mode, selecting the state switching mode to make the small cell eNodeB enter the activated state from the sleep state.

6. The method according to claim 1, further comprising:
sending the state switching information to an eNodeB of a neighbouring cell of a small cell and to UE for selection coordination of the sleep mode and interference coordination between the small cell and its neighbouring cell.

7. The method according to claim 6, wherein the state switching information further comprises time information about the state switching of the small cell eNodeB, so that the UE receives information sent by the small cell eNodeB and sends information to the small cell eNodeB according to the time information.

8. The method according to claim 1, wherein the state switching information further comprises operation indication information for indicating the small cell eNodeB is to perform the state switching independently or synergistically.

9. The method according to claim 8, wherein
when the operation indication information indicates the small cell eNodeB to perform the state switching independently, performing, by the small cell eNodeB, the state switching independently; and
when the operation indication information indicates the small cell eNodeB to perform the state switching synergistically, performing, by the small cell eNodeB, the state switching according to a decision of the MeNB.

10. The method according to claim 1, further comprising:
receiving a measurement set reported by the UE, the measurement set comprising at least one small cell eNodeB that the UE selects from discovered small cell eNodeBs and reports according to a measurement reporting policy; and
selecting a small cell eNodeB on which the state switching can be performed from the measurement set according to a selecting policy to form a switching set, wherein the switching set comprises a first switching set and a second switching set, the first switching set comprising a number of small cell eNodeBs which can enter the sleep state from the activated state, and the second switching set comprising a number of small cell eNodeBs which can enter the activated state from the sleep state.

11. The method according to claim 10, further comprising:
after forming the switching set, sending the switching set to the UE.

12. A state switching device for a small cell Evolved Node B (eNodeB), comprising:
a memory storing processor-executable instructions; and
a processor arranged to execute the stored processor-executable instructions to perform steps of:
acquiring state switching information comprising a state switching mode, the state switching information comprising an indication of a sleep mode or an indication of an activating mode, the sleep mode being a state switching mode which makes the small cell eNodeB enter a sleep state from an activated state and comprising a dynamic sleep mode, a semi-static sleep mode or a static sleep mode, and the activating mode being a state switching mode which makes the small cell eNodeB enter the activated state from the sleep state and comprising a dynamic activating mode, a semi-static activating mode or a static activating mode; and
performing state switching of the small cell eNodeB according to the state switching information,
wherein acquiring the state switching information comprising the state switching mode comprises:
receiving the state switching information sent by a macro eNodeB, a cluster head and/or an eNodeB of a neighbouring cell of a small cell; or
generating, by the small cell eNodeB per se, the state switching information; or
when the small cell eNodeB is a Secondary eNodeB (SeNB), receiving the state switching information from a Master eNodeB (MeNB) of the small cell eNodeB, and
wherein when the state switching information comprises the indication of the sleep mode, the state switching information further comprises sleep configuration corresponding to the sleep mode,
performing the state switching of the small cell eNodeB according to the state switching information comprises:
according to the indication of the sleep mode, selecting the state switching mode to make the small cell eNodeB enter the sleep state from the activated state, and
the processor is arranged to execute the stored processor-executable instructions to further perform a step of: sending, by the small cell eNodeB, a first signal according to the sleep configuration during a sleep period, wherein the first signal comprises at least one of a discovery signal, a synchronization signal, a Channel State Information-Reference Signal (CSI-RS), or a small cell specific reference signal.

13. The device according to claim 12, wherein when the state switching information comprises the indication of the activating mode,
performing the state switching of the small cell eNodeB according to the state switching information comprises:

according to the indication of the activating mode, selecting the state switching mode to make the small cell eNodeB enter the activated state from the sleep state.

14. A non-transitory computer storage medium having stored therein computer programs configured to perform a state switching method for a small cell Evolved Node B (eNodeB), the method comprising:

acquiring state switching information comprising a state switching mode, the state switching information comprising an indication of a sleep mode or an indication of an activating mode, the sleep mode being a state switching mode which makes the small cell eNodeB enter a sleep state from an activated state and comprising a dynamic sleep mode, a semi-static sleep mode or a static sleep mode, and the activating mode being a state switching mode which makes the small cell eNodeB enter the activated state from the sleep state and comprising a dynamic activating mode, a semi-static activating mode or a static activating mode; and performing state switching of the small cell eNodeB according to the state switching information, wherein acquiring the state switching information comprising the state switching mode comprises:

receiving the state switching information sent by a macro eNodeB, a cluster head and/or an eNodeB of a neighbouring cell of a small cell; or generating, by the small cell eNodeB per se, the state switching information; or when the small cell eNodeB is a Secondary eNodeB (SeNB), receiving the state switching information from a Master eNodeB (MeNB) of the small cell eNodeB, and wherein when the state switching information comprises the indication of the sleep mode, the state switching information further comprises sleep configuration corresponding to the sleep mode, performing the state switching of the small cell eNodeB according to the state switching information comprises:

according to the indication of the sleep mode, selecting the state switching mode to make the small cell eNodeB enter the sleep state from the activated state, and the method further comprises:

during a sleep period, sending, by the small cell eNodeB, a first signal according to the sleep configuration, wherein the first signal comprises at least one of a discovery signal, a synchronization signal, a Channel State Information-Reference Signal (CSI-RS), or a small cell specific reference signal.

15. The device according to claim 12, wherein the processor is arranged to execute the stored processor-executable instructions to further perform a step of:

obtaining an adjusted indication of the sleep mode and adjusted sleep configuration, and adjusting the sleep mode and the first signal.

16. The device according to claim 12, wherein the sleep configuration comprises a signal pattern and/or power of the first signal.

17. The device according to claim 12, wherein the processor is arranged to execute the stored processor-executable instructions to further perform steps of:

sending, during the sleep period, a scheduling instruction to User Equipment (UE); and receiving a result of measurement of the first signal made by the UE according to the scheduling instruction.

18. The device according to claim 12, wherein the processor is arranged to execute the stored processor-executable instructions to further perform a step of:

sending the state switching information to an eNodeB of a neighbouring cell of a small cell and to UE for selection coordination of the sleep mode and interference coordination between the small cell and its neighbouring cell.

* * * * *